United States Patent [19]
Rogers, Jr. et al.

[11] 3,868,613
[45] Feb. 25, 1975

[54] SOLVENTLESS EPOXY RESIN COMPOSITION AND AN ELECTRICAL MEMBER IMPREGNATED THEREWITH

[75] Inventors: Dow A. Rogers, Jr., Pittsburgh; James D. B. Smith, Turtle Creek, both of Pa.

[73] Assignee: Westinghouse Electric Corporation, Pittsburgh, Pa.

[22] Filed: May 18, 1973

[21] Appl. No.: 361,753

Related U.S. Application Data

[62] Division of Ser. No. 189,382, Oct. 14, 1971, Pat. No. 3,759,866.

[52] U.S. Cl............. 336/206, 117/161 ZB, 161/162, 161/163, 161/185, 161/186, 161/227, 174/120 SR, 310/208
[51] Int. Cl....................... H01f 27/32, B32b 19/00
[58] Field of Search............... 117/126 GE, 161 ZB; 161/185, 186, 184, 227, 163, 171, 162; 260/37 EP, 830 TW; 174/120 SR; 336/206; 310/208

[56] References Cited
UNITED STATES PATENTS

| | | | |
|---|---|---|---|
| 2,512,996 | 6/1947 | Bixler | 161/185 |
| 2,768,153 | 10/1956 | Shokal | 161/185 |
| 3,254,150 | 5/1966 | Rogers | 161/171 X |
| 3,547,885 | 12/1970 | Dante | 161/186 X |
| 3,556,925 | 1/1971 | Mertens | 161/163 |
| 3,794,555 | 2/1974 | Sanjana | 117/126 GE |

FOREIGN PATENTS OR APPLICATIONS

| | | | |
|---|---|---|---|
| 1,169,693 | 11/1969 | Great Britain | 161/163 |

Primary Examiner—George F. Lesmes
Assistant Examiner—Ellis P. Robinson
Attorney, Agent, or Firm—D. P. Cillo

[57] ABSTRACT

A resinous composition, suitable as a solventless impregnating resin for large rotating apparatus insulation, is made from a mixture containing about 85 to 115 parts of a bisphenol A or novolac glycidyl ether epoxy resin, about 100 to 155 parts of an acid anhydride and about 25 to 95 parts of a diglycidyl ether of neopentyl glycol.

14 Claims, 5 Drawing Figures

SOLVENTLESS EPOXY RESIN COMPOSITION AND AN ELECTRICAL MEMBER IMPREGNATED THEREWITH

CROSS REFERENCE TO RELATED APPLICATIONS

The present application is a divisional application of application U.S. Ser. No. 189,382, filed on Oct. 14, 1971, now U.S. Pat. No. 3,759,866.

BACKGROUND OF THE INVENTION

Recently, in the manufacture of large rotating machines, solventless resins have been used as bonds and impregnants for insulation which relies upon mica, in the form of paper, tape or splittings as the dielectric. Early solventless resins, developed as insulating impregnants, were sytrene-containing polyesters with a polyester backbone derived from propylene glycol, fumaric acid and adipic acid.

However, because of pronounced price competition and generally superior properties, these polyester resins have been partially replaced with epoxy resins as insulation systems. The properties that make epoxy resins superior to polyesters are improved bond strength to copper metal, thermal and hydrolytic stabilities and resistance to contamination.

Such solventless epoxy systems have, however, because of the curing agents and diluents generally employed, such as boron trifluoride monoethylamine, and 1,4 butane dioldiglycidyl ether, left much to be desired in terms of electrical and mechanical properties at elevated temperatures. Consequently, such epoxy resin systems can only be used with low voltage equipment, i.e., less than about 6.9 kv, otherwise "thermal runaway" and failure of the equipment may occur.

SUMMARY OF THE INVENTION

Briefly, the above problems are solved by impregnating an electrical member, which comprises an insulated electrical winding, with a polymerizable resinous composition containing a medium viscosity liquid glycidyl ether epoxy resin, an acid anhydride, and the diglycidyl ether of neopentyl glycol as a reactive diluent. The effective weight percent range of glycidyl polyether epoxy resin:acid anhydride:diglycidylether of neopentyl glycol is 85 to 115: 100 to 155:25 to 95 respectively.

Our results have indicated that the diglycidylether of neopentyl glycol, when used in the critical ratio described above, as an epoxy resin reactive diluent, is particularly effective and has no deleterious effect on the electrical and mechanical properties of the cured resin at elevated temperatures.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Figure 1:
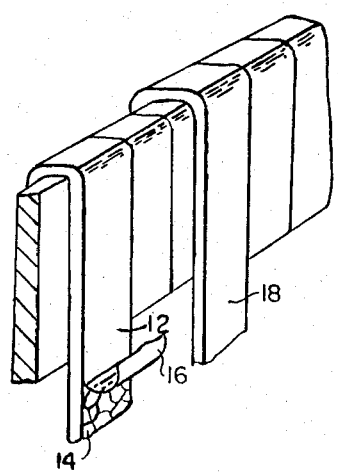
FIG. 1 is a fragmentary view in perspective showing part of a copper coil wound with the impregnated mica tape of this invention.

We have discovered that the diglycidylether of neopentyl glycol may be admixed with reactive glycidyl polyethers of the bisphenol A and novolac types and acid anhydrides, to produce solventless impregnating resins having the properties of good solvent resistance, long shelf life, low viscosity at room temperature, good gel times at elevated temperatures, enhanced water insensitivity and excellent high temperature electrical and mechanical properties. The improvement in the all-epoxy solventless impregnant comprises admixing diglycidylether of neopentyl glycol in critical proportions with a glycidyl ether epoxy-anhydride system. The useful weight percent range, to provide a good compromise of cure time, storage life and electrical and mechanical properties, is a glycidylether epoxy resin:acid anhydride:diglycidylether of neopentyl glycol ratio of 85 to 115:100 to 155:25 to 95, with a preferred range of about 100:140:40, respectively.

It has been found most advantageous to cure these polymerizable resinous compositions in the temperature range of about 150°C to 170°C to form hard tough resinous products. The composition may also include up to about 0.25 parts latent accelerator per 100 parts glycidyl ether epoxy to improve gel times at elevated temperatures. The term "latent accelerator" is taken to mean a compound which can speed up curing rates at elevated temperatures while exhibiting little or no resin cure at room temperature, thus giving good storage properties. Preferably these compounds are quaternary organic phosphonium compounds which have the structural formula:

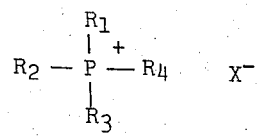

where $R_1$, $R_2$, $R_3$ and $R_4$ are aryl radicals or alkyl radicals having one to 21 carbon atoms with preferred alkyl radicals having four to 12 carbons. X, bonded to the phorphorus, is a propionate, acetate, butryate, isobutryate or dimethylphosphate radical.

The glycidyl polyether of a dihydric phenol which may be employed in the invention is obtainable by reacting epichlorhydrin with a dihydric phenol in an alkaline medium at about 50°C using 1 to 2 or more moles of epichlorhydrin per mol of dihydric phenol. The heating is continued for several hours to effect the reaction, and the product is then washed free of salt and base. The product, instead of being a single simple compound, is generally a complex mixture of glycidyl polyethers, but the principle product may be represented by the formula:

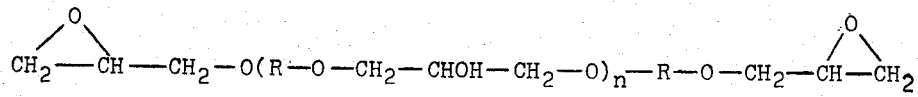

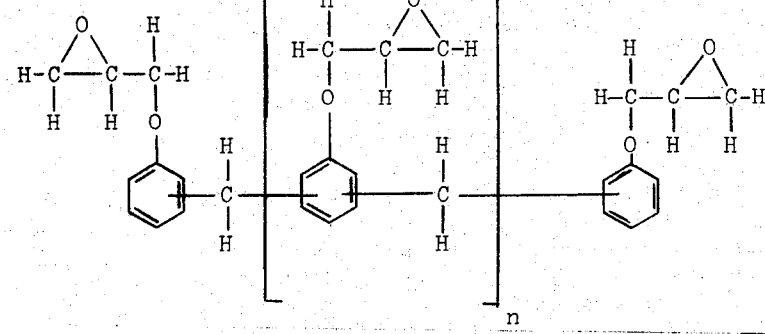

where n is an integer of the series 0, 1, 2, 3 . . . , and R represents the divalent hydrocarbon radical of the dihydric phenol. Typically R is:

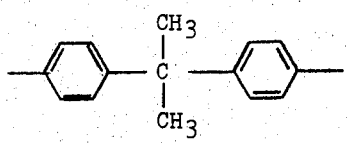

The glycidyl polyethers of a dihydric phenol used in the invention have a 1, 2 epoxy equivalency between 1.0 and 2.0. By the epoxy equivalency, reference is made to the average number of 1, 2 epoxy groups,

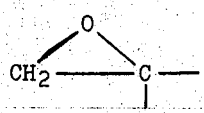

contained in the average molecule of the glycidylether. These glycidyl polyethers are commonly called bis-phenol A type epoxy resins. Bisphenol A (p,p'dihydroxy diphenyl dimethyl methane) is the dihydric phenol used in these epoxides.

Typically epoxy resins of bis-phenol A are readily available in commercial quantities and reference may be made to the *Handbook of Epoxy Resins* by Lee and Neville for a complete description of their synthesis or to U.S. Pat. Nos: 2,324,483; 2,444,333; 2,500,600; 2,511,913; 2,558,949; 2,582,985; 2,615,007; and 2,633,458.

Other glycidylether resins that are useful and which can be used in place of or in combination with bis-phenol A type epoxides in this invention include polyglycidylethers of a novolac. The polyglycidylethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac resins.

The product of the reaction is generally a massive oxidation resistant aromatic compound, one example of which is represented by the formula:

wherein n is an integer of the series 0, 1, 2, 3, etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The glycidyl ether epoxy resins may also be characterized by reference to their epoxy equivalent weight, which is the mean molecular weight of the particular resin divided by the mean number of epoxy radicals per molecule. In the present invention, the suitable epoxy resins are characterized by an epoxy equivalent weight of from about 150 to about 5,500 for the bisphenol A type and from about 100 to 500 for the epoxy novolacs. Within this range there is a preferred range of epoxy equivalent, weight of from about 160 to about 800 for the bis-phenol A type and from about 125 to 350 for the epoxy novolacs. These two types of epoxy resins may be used alone or in admixtures.

The acid anhydrides which are used in carrying out the invention include the conventional mono- and polyfunctional anhydrides. Typical of the mono-functional organic anhydrides are hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, and the like. Poly-functional organic anhydrides which may be employed include pyromellitic dianhydride, polyazelaic polyanhydride, the reaction product of trimellitic anhydride and a glycol, and benzophenone tetracarboxylic acid dianhydride. The anhydrides may be used singly or in admixture. The total anhydride content of the epoxy-anhydride mixture must lie within the range of from about 0.5 to about 1.5 anhydride equivalents for each epoxy equivalent.

Neopentyl diglycidylether is prepared by a two step process. The initial step reacts the neopentyl glycol (2,2-Dimethyl-1,3-propanediol) and epichlorohydrin in the presence of a Lewis acid, BF$_3$, to produce the chlorohydrid intermediate. This intermediate is then dehydrohalogenated by sodium hydroxide or sodium aluminate.

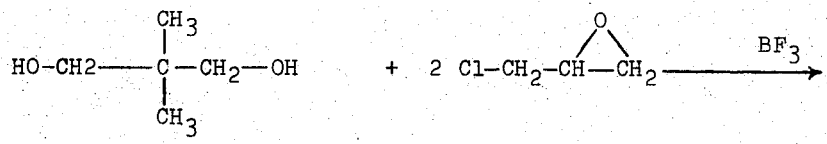

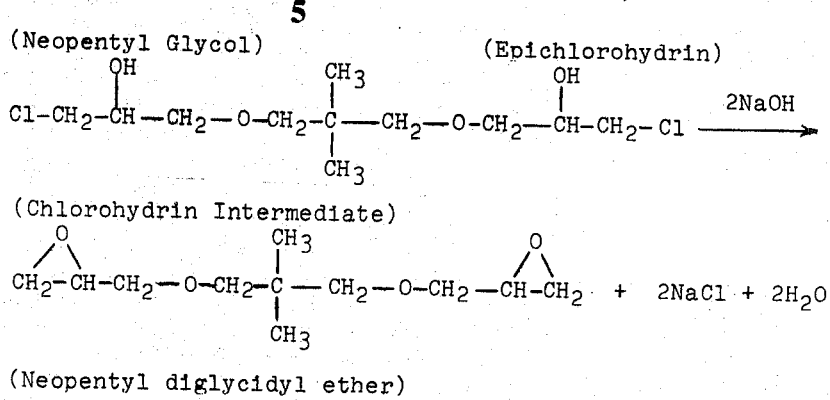

This provides an extremely low viscosity rather than resinous product. We found this aliphatic diglycidyl ether to be an excellent, non-deleterious reactive diluent particularly suitable for use in solventless insulating varnish compositions.

Thixotropic agents, such as $SiO_2$ in gel composition may be used as aids in fluidizing the composition. Similarly, various fillers, such as silica, quartz, beryllium aluminum silicate, lithium aluminum silicate and mixtures thereof in average particle sizes from about 10 to 300 microns may be employed up to about 200 parts per 100 parts glycidylether epoxy to improve electrical properties and cut the costs of the resin formulation.

Referring to FIG. 1 of the drawings, coil 10, shown as a single conductor strap of copper or aluminum for instance, is first wrapped with an overlapping layer of tape 12. The tape 12 comprises mica flakes 14 and a sheet backing 16 all united with a liquid resinous binder. The tape may be applied half-lapped, butted or otherwise. One or more additional layers 18 of mica tape, similar to tape 12 may be applied. To impart better abrasion resistance and to secure a tighter insulation an outer wrapping of tape made of a tough fibrous material, such as glass fiber, asbestos, or the like may be applied to the coil.

The mica tape for building coils in accordance with the present invention is prepared from a sheet backing material upon which is disposed a layer of mica flakes. The sheet backing and the mica flakes are treated with liquid resinous binder. The mica flakes are then preferably covered with another layer of sheet backing in order to protect the layer of mica flakes and to produce a more uniform insulation. This mica insulation is preferably in the form of a tape of the order of 1 inch in width though tapes or sheet insulation of any other width may be prepared.

For building electrical machines, the sheet backing for the tape may comprise paper, cotton fabrics, asbestos paper, glass cloth or glass fibers, or sheets or fabrics prepared from synthetic resins such as nylon, polyethylene and linear polyethylene terephthalate resins. Sheet backing material of a thickness of approximately 1 mil, to which there has been applied a layer of from 3 to 10 mils thickness of mica flakes has been successfully employed. The liquid binders for the mica flakes can be liquid linear polyesters or epoxy resins that are soluble in and compatible with the resinous compositions of this invention that will be employed in subsequently impregnating the coils.

The coil with the applied layers of mica insulation is then vacuum impregnated with the liquid, completely reactive polymerizable resinous composition of this invention. After vacuum impregnation, the insulated coil is exposed to the atmosphere, and upon the application of heat and pressure, a thermally stable, relatively flexible insulation is formed.

Coils produced by the impregnation of the mica wrapping with any of the completely reactive compositions of this invention are placed in a hot press in which the slot portions are subjected to heat and pressure for a period of time of about one hour at 100°C to 150°C to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions.

Figure 2:
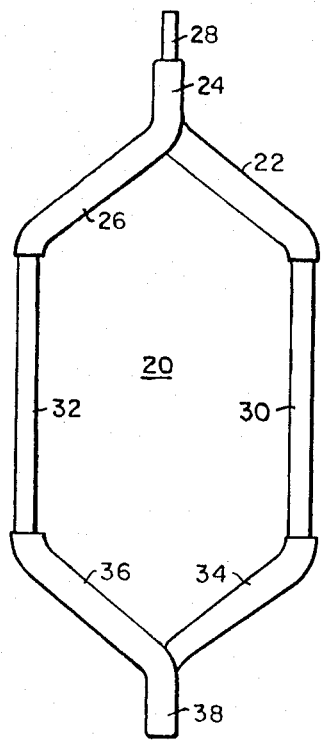
FIG. 2 is a plan view of a closed full electrical coil member having two slot portions.

A closed full coil 20 prepared in accordance with the present invention is illustrated in FIG. 2. The full coil comprises an end portion comprising a tangent 22, a connecting loop 24 and another tangent 26 with bare leads 28 extending therefrom. Slot portions 30 and 32 of the coil which have been hot pressed to cure the resin and to form them to predetermined shape and size, are connected to the tangents 22 and 26, respectively. These slot portions are connected to other tangents 34 and 36 connected through another loop 38.

The complete full coils prepared as disclosed herein, with cured slot portions and uncured end portions are placed within the slots of the stator or rotor of an electrical machine and the end windings wrapped and tied together. The uninsulated leads are then soldered, welded or otherwise connected to each other or to the commutator. Thereafter, the entire machine will be placed in an oven and heated to a temperature to cure the completely reactive composition applied to the end portions.

EXAMPLE 1

A resin formulation was made containing 70 grams of a liquid diglycidyl ether of bisphenol A resin, having an epoxy equivalent weight of 172–176 and a viscosity at 25°C of 4,000–6,400 cp. (sold commercially by Dow Chemical Company under the Tradename DER 332), 100 grams of 1-methyltetrahydrophthalic anhydride, and 30 grams of neopentyl diglycidyl ether having an epoxy equivalent weight of about 150 and a viscosity at 27°C of about 4 cp., to provide a glycidyl ether epoxy resin:acid anhydride: diglycidyl ether of neopentyl glycol weight ratio of 100:143:43.

Accelerators were added to this resin formulation to form: sample A containing 0.08 methyltrioctyl phosphonium dimethylphosphate; sample B containing 0.12 grams methyltrioctyl phosphonium dimethylphosphate; sample C containing 0.08 grams tetrabutylphosphonium acetate; sample D containing 0.12 grams tetrabutylphosphonium acetate and sample E containing 5 grams zinc stearate.

These components were poured into a container, stirred at room temperature and then put in a paint mixer for about five minutes. Ten gram samples were than poured into flat 2 inches diameter aluminum dishes. These samples were placed in a 135°C oven and inspected every 20 to 30 minutes to record the gel time of the samples. The approximate gel time was considered to be the amount of time it took the formulation to start to solidify.

Storage properties of the mixtures were found by measuring viscosities at 27°C in Gardener-Holdt bubble tubes. Measurements were usually taken at one-week intervals. The termination of the catalyzed lifetime (pot-life) of these formulations was considered to be when the viscosity reached a value of 1,000 cp. at 27°C.

Sample E was subjected to room temperature solvent and chemical resistance tests by immersion of a casting, 3 × 1 × ⅛ inches, cured 16 hours at 135°C and 4 hours at 150°C, in various solvents. Changes in thickness, weight, and Shore D hardness were then measured periodically.

The dielectric constant and 60 Hz power factors (100 × tan δ) were measured at 75° and 125°C (ASTM designation D150-65T) on 3 × 1 × ⅛ inches castings cured for 16 hours at 135°C and 4 hours at 150°C. The results of the gel, storage life tests and electrical tests, and solvent tests are given in Tables 1 and 2.

Mechanical properties such as tensile modulus, tensile strength and % elongation were obtained using dog bone castings (ASTM designation D651) over a wide temperature range. The results of these tests are given in FIGS. 3, 4, and 5, respectively.

These resin formulations have also been used as a solventless varnish in a sheet mica insulation and tested as sheet insulation for coils in electric motors. Experimental data with 2,300 volt coils using 6 weight percent epoxy resin binder for mica tape having a Dacron (polyethylene terephthalate) backing and impregnated with the varnish of this invention, provided power factor values at 150°C (100 × tan δ) of 21 percent. Similar coils impregnated with the epoxy varnish of Example 2 below, using diglycidyl ether of 1,4 butane diol as co-reactive diluent instead of neopentyl glycol diglycidyl ether, provided power factor values at 150°C of 50 percent.

EXAMPLE 2

To provide comparative data, a resin formulation containing a bisphenol A epoxy resin using diglycidyl ether of 1,4 butane diol epoxy reactive diluent and a furfuryl alcohol-BF3 monoethylamine curing agent was used. This formulation, sample F, contained 70 grams of a liquid diglycidyl ether of bisphenol A resin having an epoxy equivalent weight of 182–189 and a viscosity at 25°C of 7,000–1,000 cp. (sold commercially by Ciba Products Co. under the Tradename Araldite 6005), 30 grams of 1,4-butanediol diglycidyl ether having an epoxy equivalent weight of 136 and a viscosity at 25°C of 19 cp. (sold commercially by Ciba Products as a diluent under the Tradename Araldite RD-2 Di-Epoxy Reactive Modifier), 2 parts boron trifluoride monoethylamine curing agent and 6.5 parts of furfuryl alcohol curing agent. The ingredients were reacted and the same tests run under the same conditions as in Example 1. The results are given in Table 1, Table 2, and FIGS. 3, 4 and 5 below.

TABLE 1

| Sample | Gel Time at 135°C (minutes) | Pot Life at 27°C (days) | Power Factor at 125°C (100 × tan δ) | Dielectric Constant at 75°C |
|---|---|---|---|---|
| A | 120 | 170+ | — | — |
| B | 80 | 170+ | 8.5 | 2.9 |
| C | 75 | — | — | — |
| D | 65 | — | 9.2 | 2.8 |
| E | — | — | — | — |
| F | — | — | 700 | 20 |

TABLE 2

Solvent and Chemical Resistance

| Sample | Solvent | Immersion Time (days) | Shore D Hardness | % Weight Change | % Thickness Change |
|---|---|---|---|---|---|
| E | none | — | 86 | 0 | 0 |
|   | 50% acetic acid | 10 | 85 | 0 | 0 |
|   | 10% NaOH | 10 | 86 | 0 | 0 |
|   | 100% acetone | 7 | 68 | +7.9 | +9.1 |
|   | 100% benzene | 10 | 85 | 0 | 0 |
|   | 100% trichloroethylene | 7 | 60 | +20 | +12 |
|   | 100% water | 10 | 85 | 0 | 0 |
| F | none | — | 80 | 0 | 0 |
|   | 50% acetic acid | 10 | 67 | +4.5 | +3.8 |
|   | 10% NaOH | 10 | 80 | 0 | 0 |
|   | 100% acetone | 3 | decomposed | — | — |
|   | 100% benzene | 10 | 55 | +10 | 13 |
|   | 100% trichloroethylene | 3 | decomposed | — | — |
|   | 100% water | 10 | 77 | +1 | 0 |

The comparative data in Table 1 of samples B, D, and F, show much superior electrical properties for the formulations containing the neopentyl diglycidyl ether (samples B and D). The comparative data in Table 2 of samples E and F show superior solvent and chemical resistance properties for the formulation containing neopentyl diglycidyl ether (sample E).

Figure 3:
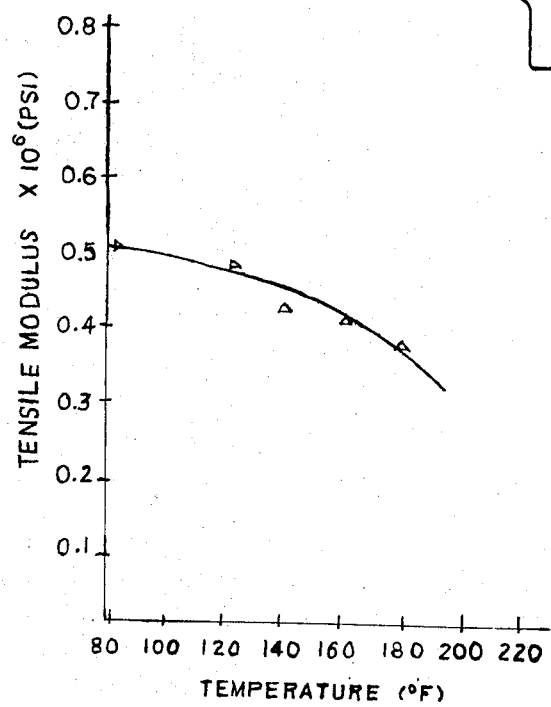
FIG. 3 is a graph of tensile modulus v. temperature for cured resin samples, one of which contains neopentyl diglycidylether.
Figure 4:
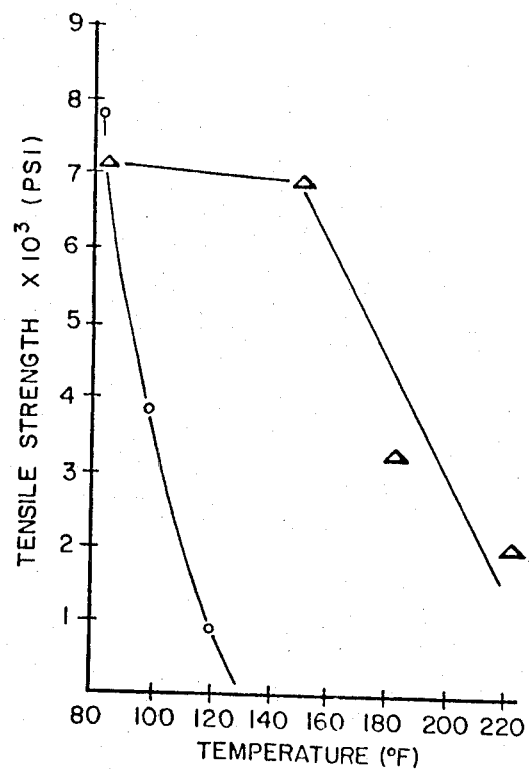
FIG. 4 is a graph of tensile strength v. temperature for cured resin samples, one of which contains neopentyl diglycidylether.
Figure 5:
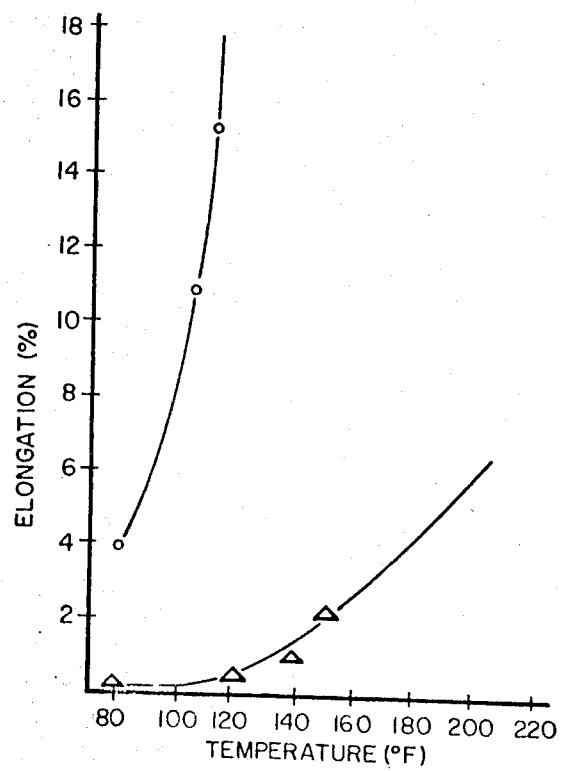
FIG. 5 is a graph of % elongation v. temperature for cured resin samples, one of which contains neopentyl diglycidylether.

FIG. 3 shows the rapid drop in tensile modulus of sample F, circle points, compared to the formulation containing neopentyl diglycidyl ether, triangle points, (sample B). FIG. 4 shows the superior tensile strength properties, particularly at elevated temperatures of the formulation containing neopentyl diglycidyl ether, line through the triangles, (sample B). FIG. 5 shows the superior retention of flexibility of the formulation containing neopentyl diglycidyl ether, line through the triangles, (sample B).

Electrical properties, and in particular power factor ($100 \times \tan \delta$) are of great importance for insulation systems in high voltage equipment. Good tensile modulus, tensile strength and % elongation values at room temperature and at elevated temperatures are also very important requirements for insulating resins. The comparative data in Tables 1 and 2 and FIGS. 3, 4 and 5 illustrate that neopentyl diglycidyl ether is an extremely useful component, in an insulating resin system, as a reactive diluent that does not have any deleterious effect on the electrical and mechanical properties of solventless all-epoxy resin impregnants which may be used as insulation for coils and other electrical members.

We claim:

1. An insulated electrical member for use in high voltage equipment and a cured body of resinous insulation applied to the member, the high voltage capability insulation comprising the cured resinous reaction product of a composition consisting essentially of, by weight:
   A. about 85 to 115 parts of a glycidyl ether epoxy resin selected from the group consisting of bisphenol A epoxy resins, novolac epoxy resins and mixtures thereof;
   B. about 100 to 155 parts of an organic acid anhydride;
   C. about 25 to 95 parts of diglycidyl ether of neopentyl glycol acting as a reactive diluent; and
   D. an effective amount up to about 0.25 parts per 100 parts glycidyl ether epoxy resin of a quaternary organic phosphonium salt acting as a latent catalyst for the epoxy resin and having the structural formula:

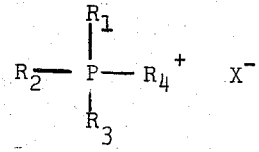

where $R_1$, $R_2$, $R_3$ and $R_4$ are selected from the group consisting of aryl and alkyl radicals and X is selected from the group consisting of propionate, acetate, butryate, isobutyrate and dimethyl phosphate radicals.

2. The insulated electrical member of claim 1 wherein the bisphenol A epoxy resin component of the insulation has an epoxy equivalent weight of from about 150 to 5,500 and the novolac epoxy resin component of the insulation has an epoxy equivalent weight of from about 100 to 500.

3. The insulated electrical member of claim 1 wherein the member is a conductor selected from the group consisting of copper and aluminum and the insulation also contains mica.

4. The insulated electrical member of claim 1 wherein the member is an electrical coil and the insulation comprises a mica tape impregnated with the resinous insulation.

5. The insulated electrical member of claim 1 wherein the insulation also contains mica and is supported by a backing of a sheet material selected from the group consisting of paper, cotton fabric, asbestos paper, glass fibers, nylon, polyethylene and polyethylene terephthalate.

6. The insulated electrical member of claim 5 wherein the supported insulation is wrapped around the electrical member and the backing is impregnated with the resinous reaction product.

7. The insulated electrical member of claim 5 wherein the acid anhydride is selected from the group consisting of hexahydrophthalic anhydride, 1-methyl hexahydrophthalic anhydride, tetrahydrophthalic anhydride, phthalic anhydride, NADIC anhydride, NADIC methyl anhydride, 1-methyltetrahydrophthalic anhydride, pyromellitic anhydride, polyazelaic polyanhydride, benzophenone tetracarboxylic acid dianhydride and mixtures thereof.

8. An insulated electrical member for use in high voltage equipment and a cured body of resinous insulation applied to the member, the high voltage capability insulation comprising the cured resinous reaction product of a composition consisting essentially of, by weight:
   A. about 85 to 115 parts of a glycidyl ether epoxy resin selected from the group consisting of bisphenol A epoxy resins, novolac epoxy resins and mixtures thereof;
   B. about 25 to 95 parts of a diglycidyl ether of neopentyl glycol acting as a reactive diluent;
   C. an effective amount up to about 0.25 parts per 100 parts glycidyl ether epoxy resin of a quaternary organic phosphonium salt acting as a latent catalyst for the epoxy resin and having the structural formula:

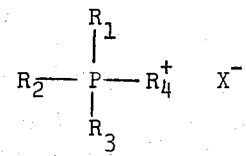

where $R_1$, $R_2$, $R_3$ and $R_4$ are selected from the group consisting of aryl and alkyl radicals having one to 21 carbon atoms and X is selected from the group consisting of propionate, acetate, butryate, isobutyrate and dimethyl phosphate radicals; and
   D. an effective amount of organic acid anhydride acting as curing agent for the epoxy resin, to provide from about 0.5 to about 1.5 anhydride equivalents for each epoxy equivalent provided by the glycidyl ethers of components (A) and (B).

9. The insulated electrical member of claim 8 wherein the bisphenol A epoxy resin component of the insulation has an epoxy equivalent weight of from about 150 to 5,500 and the novolac epoxy resin component of the insulation has an epoxy equivalent weight of from about 100 to 500.

10. The insulated electrical member of claim 8 wherein the member is a conductor selected from the group consisting of copper and aluminum and the insulation also contains mica.

11. The insulated electrical member of claim 8 wherein the member is an electrical coil and the insulation comprises a mica tape impregnated with the resinous insulation.

12. The insulated electrical member of claim 8 wherein the insulation also contains mica and is supported by a backing of a sheet material selected from the group consisting of paper, cotton fabric, asbestos paper, glass fibers, nylon, polyethylene and polyethylene terephthalate.

13. The insulated electrical member of claim 12 wherein the supported insulation is wrapped around the electrical member and the backing is impregnated with the resinous reaction product.

14. The insulated electrical member of claim 12 wherein the acid anhydride is selected from the group consisting of hexahydrophthalic anhydride, 1-methyl hexahydrophthalic anhydride, tetrahydrophthalic anhydride, phthalic anhydride, NADIC anhydride, NADIC methyl anhydride, 1-methyltetrahydrophthalic anhydride, pyromellitic anhydride, polyazelaic polyanhydride, benzophenone tetracarboxylic acid dianhydride and mixtures thereof.

* * * * *